United States Patent
Mendes

(10) Patent No.: US 11,641,338 B2
(45) Date of Patent: May 2, 2023

(54) DISTRIBUTED NAME RESOLUTION FOR GEO-LOCATION BASED NETWORKING

(71) Applicant: Airbus (S.A.S.), Blagnac (FR)

(72) Inventor: Paulo Mendes, Munich (DE)

(73) Assignee: Airbus (S.A.S.), Blagnac (FR)

( * ) Notice: Subject to any disclaimer, the term of this patent is extended or adjusted under 35 U.S.C. 154(b) by 0 days.

(21) Appl. No.: 17/846,671

(22) Filed: Jun. 22, 2022

(65) Prior Publication Data

US 2022/0417208 A1 Dec. 29, 2022

(30) Foreign Application Priority Data

Jun. 23, 2021 (EP) ..................................... 21181275

(51) Int. Cl.
*H04L 29/12* (2006.01)
*H04L 61/30* (2022.01)
(Continued)

(52) U.S. Cl.
CPC .......... *H04L 61/30* (2013.01); *H04L 61/4552* (2022.05); *H04L 61/58* (2022.05); *H04L 2101/69* (2022.05)

(58) Field of Classification Search
CPC . H04L 45/00; H04L 45/52–56; H04L 45/566; H04L 45/58; H04L 45/60;
(Continued)

(56) References Cited

U.S. PATENT DOCUMENTS 8,238,317 B2 8/2012 Yang et al.
9,832,705 B1 11/2017 Newton et al.
(Continued)

FOREIGN PATENT DOCUMENTS

CN 111628931 A * 9/2020
WO WO 2017/063866 A1 4/2017

OTHER PUBLICATIONS

Dannewitz et al., Network of Information (NetInf)—An information-centric networking architecture, ScienceDirect (Year: 2013).*
(Continued)

*Primary Examiner* — Boris D Grijalva Lobos
(74) *Attorney, Agent, or Firm* — KDW Firm PLLC

(57) ABSTRACT

Systems and methods for resolving names in a data network. A data network includes an information-centric network layer, ICN-layer, with multiple routers, and a name resolution layer with multiple name resolvers. Each router receives an interest packet announcement describing data objects provided by a data producer. Each router determines a first name resolver of the name resolution layer closest to the data producer and sends a name of the provided data object and geo-location of the data producer to the first name resolver. The first name resolver transmits the name of the data object and geo-location of the data producer to other name resolvers. Each router receives an interest packet request describing a data object requested by a data consumer. Each router transmits the interest packet request to a second name resolver spatially closest to the data consumer. Each name resolver provides the geo-location of the requested data object to the data consumer.

12 Claims, 4 Drawing Sheets

(51) Int. Cl.
*H04L 61/4552* (2022.01)
*H04L 61/58* (2022.01)
*H04L 101/69* (2022.01)

(58) Field of Classification Search
CPC ....... H04L 45/74; H04L 45/745; H04L 61/00; H04L 61/09–103; H04L 61/25–2503; H04L 61/30; H04L 61/301–3025; H04L 61/35; H04L 61/45; H04L 61/4541; H04L 61/4552; H04L 61/4594; H04L 61/58; H04L 67/00; H04L 67/51; H04L 67/52; H04L 2101/69
See application file for complete search history.

(56) References Cited

U.S. PATENT DOCUMENTS

| | | | | |
|---|---|---|---|---|
| 10,033,692 | B1* | 7/2018 | Vavrusa | H04L 61/59 |
| 2009/0262741 | A1* | 10/2009 | Jungck | H04L 47/24 |
| | | | | 370/392 |
| 2014/0025775 | A1* | 1/2014 | Lee | H04L 67/10 |
| | | | | 709/217 |
| 2019/0141495 | A1 | 5/2019 | Jha et al. | |
| 2021/0058363 | A1* | 2/2021 | Shen | H04L 67/52 |
| 2021/0067468 | A1* | 3/2021 | Cidon | H04L 45/745 |
| 2021/0250408 | A1* | 8/2021 | Chen | H04L 67/141 |

OTHER PUBLICATIONS

Yan Zhang et al., "Wireless Mesh Networking," Jan. 1, 2007, Auerbach Publications, p. 120.
Wang ZW et al., "Vector address routing protocol for MANET," Signal Processing, 2008. ICSP 2008. 9th International Conference on IEEE, Piscataway, NJ, Oct. 26, 2008. pp. 2640-2644.
Ahlgren B. et al., "A survey of information-centric networking," IEEE Communications Magazine, IEEE Service Center, Piscataway, US, vol. 50, No. 7, Jul. 1, 2012.
Dannewitz, Christian et al., "Network of Information (NetInf)—An information-centric networking architecture," Computer Communications, Elsevier Science Publishers BV, Amsterdam, NL, vol. 36, No. 7, Jan. 27, 2013.
Wang Xiaonan et al., "Vehicular Content-Centric Networking Framework," IEEE Systems Journal, IEEE, US. vol. 13, No. 1. Mar. 1, 2019, pp. 519-529.
Arafat Muhammad Yeasir et al., "Routing Protocols for Unmanned Aerial Vehicle Networks: A Survey," IEEE Access, vol. 7, Jul. 25, 2019, pp. 99694-99720.
Anonymous, "How Switches Forward Frames Explained," www.computernetworkingnotes.com, Feb. 25, 2021, pp. 1-4.
European Search Report for U.S. Appl. No. 21/181,275 dated Nov. 3, 2021.
European Search Report for U.S. Appl. No. 21/181,278 dated Dec. 2, 2021.
European Search Report for U.S. Appl. No. 21/181,232 dated Dec. 3, 2021.

* cited by examiner

DISTRIBUTED NAME RESOLUTION FOR GEO-LOCATION BASED NETWORKING

CROSS-REFERENCE TO RELATED APPLICATION

This application claims priority to EP 21181275.5 filed Jun. 23, 2021, the entire disclosure of which is incorporated by reference herein.

TECHNICAL FIELD

The description relates to name resolution in a data network. In particular, the description relates to name resolution in data networks with dynamically changing network topology.

BACKGROUND

Data networks are generally used to transmit data between data producers and data consumers. Data networks typically have a topology that is known a priori. Based on the known topology of the data network, data packets are routed from one end device via one or more routers to another end device. For redundancy reasons, multiple different routes may be provided, and the routers choose one or more of these routes for transmitting data.

In the information centric networking (ICN) paradigm, locating a piece of information or a data object in a network and routing a request to retrieve such data object from the best location are closely related. Generally, two major strategies can be applied to this purpose: a full name based approach in which the routing operates only based on names, or a hybrid approach in which routing works based on locators like IP addresses or geo-location identifiers which are retrieved from the data name by a resolution scheme.

At least some of the basic routing schemes that are based on names rely on flooding approaches in which requests for data are flooded in the network until a potential source is found and a router announces the names of the locally available data objects to other routers by a flooding protocol, and then any other router can request a data object by forwarding a request for the respective data object to the best data source(s).

To avoid scalability problems of name-based routing schemes, a name resolution scheme may be used, allowing routers to translate names into locators which are then used by regular routing protocols for ad-hoc networks. Name resolution schemes map an identifier of a data object to a locator.

Typically, name resolution approaches have a lower overhead compared to flooding approaches when facing an increase in the rate of data requests and publications of data objects, as well as of the number of devices in the data network. However, name resolution approaches may have a much higher latency when the number of devices in the network increases. This typically occurs because the name resolution schemes are not locality aware, and the resolvers may be far away from the requesters.

SUMMARY

It may be seen as an object to simplify data exchange and name resolution in data networks with dynamically changing network topology by reducing the communication overhead that is required for resolving the geo-location of a requested data object. This object is solved by the subject matter disclosed herein.

A data network is disclosed herein. Further developments of the disclosure herein can be derived from the following description.

Furthermore, a method for resolving names of data objects in a data network is provided. Many of the features described with reference to the data network may be implemented as method steps, or vice versa. Therefore, the description provided in the context of the data network applies in an analogous manner also to the method.

According to an aspect, a data network is provided. The data network includes an information-centric network layer, ICN-layer, with multiple routers, and a name resolution layer with multiple name resolvers. At least one router of the ICN-layer is a mobile device and includes a first interface configured to establish a connection to another router of the ICN-layer, a second interface configured to establish a connection to an end device, and a third interface configured to establish a connection to a name resolver of the name resolution layer. Each router of the multiple routers of the ICN-layer is configured to receive an interest packet announcement describing data objects provided by a data producer. Furthermore, each router of the multiple routers of the ICN-layer is configured to determine a first name resolver of the name resolution layer that is spatially closest to the data producer and send a name of the provided data object and a geo-location of the data producer to the first name resolver. The first name resolver is configured to transmit the name of the provided data object and the geo-location of the data producer to the other name resolvers of the name resolution layer. Each router of the multiple routers of the ICN-layer is configured to receive an interest packet request describing a data object requested by a data consumer. Each router of the multiple routers of the ICN-layer is configured to transmit the interest packet request to a second name resolver that is spatially closest to the data consumer. Each name resolver is configured to provide the geo-location of the requested data object to the data consumer.

The data network generally implements the following function: information about provided data objects is sent to the routers and resolvers, resolvers store information about the provided interest packets, and provide the requested information to a data consumer, when a data consumer requests a data object; the information about the provided data object is synchronized throughout the resolvers.

The end devices connected to a router of the ICN-layer are devices of end users and may be data consumers or data producers.

The name resolvers know what data objects are provided or offered by data producers and they also know where these data producers are located. In the context of this description, the name of a data object may relate to a data object as such and/or to a network service, wherein a network service may also be described by a certain data object.

Determining the resolver that is spatially closest to the data producer relates to a physical distance between the data producer and the resolver. The closest resolver is determined by comparing the position of the data producer with the position of multiple resolvers and choosing the resolver that is geographically closest to the data producer. The positions of the resolvers may be stored in look-up tables that are accessible by the routers of the ICN-layer.

The approach described herein enables to identify the geo-location of a data object in a dynamic network. A router of the ICN-layer is being informed about data objects that are offered by a data producer (e.g., an end device that is connected to a router of the ICN-layer). The router of the ICN-layer sends information to the name resolvers so that these are aware of the geo-location of the data object. The information about a data object and its geo-location is communicated throughout the name resolvers. When a data consumer requests the data object by sending a request to a name resolver, the information about the geo-location of the data object is provided to the data consumer.

Particularly, this approach simplifies the process of identifying the geo-location of a requested data object because there is no need to flood the network with messages relating to the request for a data object. Instead, the name resolvers are proactively provided with information about the geo-location of a provided data object and this information is communicated throughout the name resolvers.

Once the data consumers know the geo-location of a data object, the respective router can be requested to provide the data object. The process of resolving the name and identifying the geo-location of a data object as well as requesting and providing the requested data object are separated. The geo-location is used to request the closest data producer for a data object so that the data object is transmitted to the data consumer in an efficient manner.

This approach is particularly beneficial for use in ad-hoc networks with mobile data consumers and data producers that change their geo-location. In order to identify where a data producer is located and how this data producer can be reached via a network, its geo-location is used.

According to an embodiment, at least some of the multiple routers of the ICN-layer are located aboard mobile units.

For example, at least two routers or even all routers of the ICN-layer are located aboard mobile units. The mobile units may be aircraft that change their geo-location in a known and predictable manner (for example, commercial aircraft, that move along a predetermined and planned flight path) or in an a priori unknown and unpredictable manner (for example, military aircraft, that may need to change their flight path in accordance with altered circumstances and changed mission plans).

However, the mobile units may also be land vehicles, submarine vessels, watercraft, or any other vehicles.

According to another embodiment, at least one router of the ICN-layer includes a cache memory, wherein the cache memory of the at least one router is configured to store the data objects provided by a data producer.

In this embodiment, it is not required to forward the request from a data consumer to the data producer, but a router can directly provide the requested data object to the data consumer. This can reduce communication overhead in the data network.

According to another embodiment, the multiple name resolvers are static components.

According to another embodiment, at least one name resolver of the multiple name resolvers incudes a cache memory, wherein the cache memory of each name resolver is configured to store data objects provided by a data producer.

According to another embodiment, the connection between routers of the ICN-layer is an information-centric network data link.

According to another embodiment, the data object announcement received by the routers of the ICN-layer includes: a data object source indicating the origin of a data object; a data object name indicating a name of the data object; a data object type indicating a topic of the data object; quality of service requirements of the data object; a geo-location of the data producer of the data object indicating a geographic location of the data and/or of the data producer; a lifespan of the data object indicating a validity date of the data.

According to another embodiment, each router of the multiple routers of the ICN-layer is configured to determine a name resolver closest to the data producer and/or the data consumer based on known geographic locations of the name resolvers and a current position of the data producer and/or data consumer.

According to another embodiment, each router of the multiple routers of the ICN-layer includes a look-up table with the geographic locations of the name resolvers.

According to another embodiment, the data network implements a data synchronization mechanism between the name resolvers of the name resolution layer to synchronize information about the name of a data object and the geo-location of the respective data producer.

According to another embodiment, the name resolvers are configured to communicate with each other via multicast addresses.

According to another embodiment, a method for resolving names in a data network is provided. In one embodiment, the method includes the steps: receiving, by a router of multiple routers of an information-centric network layer, ICN-layer, an interest packet announcement describing data objects provided by a data producer; determining, by the router, a first name resolver of a name resolution layer, that is spatially closest to the data producer; sending, by the router, a name of the provided data object and a geo-location of the data producer to the first name resolver; transmitting, by the first name resolver, the name of the provided data object and the geo-location of the data producer to other name resolvers of the name resolution layer; receiving, by the router, an interest packet request describing a data object requested by a data consumer; transmitting, by the router, the interest packet request to a second name resolver that is spatially closest to the data consumer; and providing, by each name resolver of the name resolution layer, the geo-location of the requested data object to the data consumer.

The functions described with reference to the data network and its components may be implemented as method steps.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
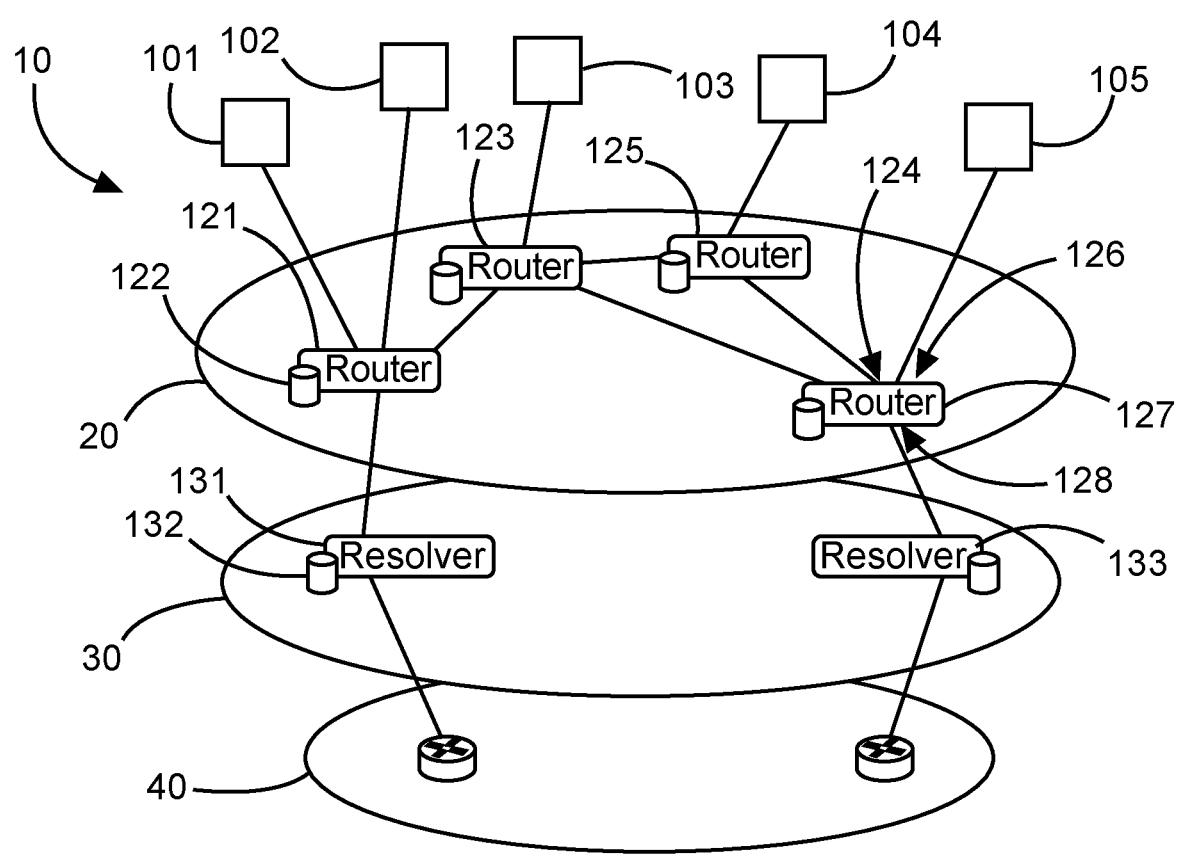
FIG. 1 is a schematic representation of a data network.

The following detailed description is merely to provide examples in nature and is not intended to limit the disclosure herein and uses of the disclosure herein. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows an example embodiment of a data network 10. The data network 10 may particularly be a network that includes at least some mobile components, like in an airborne mobile ad-hoc network that is set up amongst flying devices (e.g., commercial aircraft, military aircraft, satellites, or the like), some of which have a connection to a ground network infrastructure.

An airborne mobile ad-hoc network typically encompasses intermittent wireless, Radio Frequency (RF) and Free Space Optics (FSO) links among flying devices, as well as between flying devices and the ground: wireless links are intermittently available, since flying devices are only collocated at certain time slots, which may be known in advance or not. It is assumed that in an airborne mobile ad-hoc network, flying devices may dynamically discover each other, through local operations via RF links or based on offline data such as geo-position (provided by systems such as automatic dependent surveillance—broadcast, ADS-B), flight missions and orbits, forming a network with a flat hierarchy.

In such a dynamic setup, where network topology changes over time, geographic routing may be an effective solution for airborne mobile ad-hoc networks especially because of the availability of global positioning system services and grid reference systems (e.g., Military Grid Reference System-MGRS) that allows locating a flying device with different precision (from 10 Km to 1 m, for example).

However, current and future communication services are generally built around the concept of information/data instead of host-to-host connections, being those connections based on topologic information (e.g., IP addresses) or location information (e.g., GPS coordinates). Hence there is a mismatch between what the communication services do (information/data access) and what the networking does (connection between hosts).

This mismatch can be mitigated by the Information-Centric Networking (ICN) paradigm. In an ICN framework an information object (or, generally speaking, a data object) has a unique name and can be stored or cached at multiple locations in the network. The name is independent of topological locators, such as host addresses, and is used to discover and retrieve an information object from the best location. In this context, data can be exchanged by exploiting new routing algorithms fully based on names, or by making usage of existing locator based routing algorithms. In the latter case, a name—locator translation scheme is required.

Based on the idea of exploiting existing locator aware routing protocols for the deployment of ICN based flying ad-hoc networks, the data network 10 described herein implements a mechanism to provide the translation of data object names used by communication services to geographic locators used by geographic routing protocols.

Generally, in an ICN framework, locating an information object (or data object) in the network and routing a request to retrieve such data from the best location are closely related. In this context, two major strategies can be applied: a full name based approach, in which the routing operates only based on names; and a hybrid approach, in which routing works based on locators (IP addresses or geo-location identifiers) which are retrieved from the data name by a resolution scheme.

The basic routing scheme based on names, relies on flooding approaches: i) requests for data are flooded in the network until a potential source is found; ii) a router announces the names of the locally available data objects to other routers by a flooding protocol, and then any other router can request a data object by forwarding a request to the best data source(s). In order to improve scalability, some name aggregation scheme can be performed during flooding to reduce overhead.

In order to avoid scalability problems of name-based routing schemes, a name resolution scheme can be used allowing routers to translate names into locators, which are then used by regular routing protocols for ad-hoc networks.

Some name resolution schemes use Distributed Hash Tables (DHT) to map the identifier of a data object to a locator. For example, the resolver for a data object identifier (DOI) with a hash value H(DOI) is the locator of the router with the hash value whose address (topologic or geographic) is the closest to H(DOI) in the hash space.

Name resolution schemes based on DHT approaches do not cause the scalability issues of basic name-based routing, since they do not require flooding during the data publishing process and a router only needs to inform the necessary resolvers about the names of the data objects it provides. However, DHT approaches may incur in extra latency since they require additional actions to retrieve data. Namely, when a router receives a request to collect some data, it sends a name resolution query to the right resolver (resulting from a DHT operation) to obtain the current locator of the device where the requested data is stored. This latency is caused mainly by the distance between the requester and the selected resolver.

Hence, although name resolution approaches may have lower overhead than name flooding approaches when facing an increase in the rate of data requests and publications, as well as in the number of devices in the network, they may have a much higher latency when the number of devices in the network increases. This is due to the fact that DHT schemes are not locality-aware, and the resolvers may be far away (physically or geographically) from the requesters. Moreover, current proposals for DHT based name resolution systems take into account the underlying physical network topology, for instance to setup multiple DHT areas arranged in a nested, hierarchical structure. Other DHT systems are based on DHT algorithms developed for peer-to-peer overlay networks assuming that the DHT system is independent of the underlying routing/forwarding layer, by relying in their own mechanisms for discovering, bootstrapping, and maintaining the DHT, which result in complexity and inefficiency.

The data network 10 and the method for resolving a name of a data object in a network (see FIGS. 4 and 5) described herein aim to mitigate the limitations of the DHT based name resolution schemes described above. This is particularly achieved by: i) identifying resolvers that are closer or closest to requesters; ii) independent of the topology of the ad-hoc network; and iii) being based on a geographic routing aiming to simplify the name resolution process.

The name resolution scheme for mobile ad-hoc networks described herein is based on geographic routing in consideration of the geographic location of the participants (end devices) and network nodes (routers and name resolvers).

The proposed name resolution scheme allows the deployment of different types of networks, from a very dynamic one (e.g., data networks involving military networks and military aircraft during operation) to less dynamic ones (e.g., low-earth-orbit satellite constellations), and/or mobile but predictable networks (e.g., mesh of commercial aircrafts with a priori known movement trajectories).

In what concerns existing networking paradigms, the proposed name resolution scheme aims to support the development of novel network architectures based on the ICN paradigm, such as Named-Data Networking (NDN), eliminating the gap between the current host centric operation of IP networks and the content/data orientation of applications.

The data network 10 shown in FIG. 1 encompasses three logical or structural layers, namely an information-centric network layer, ICN-layer, 20, a name resolution layer 30, and a data transmission layer 40. The data network 10 interconnects end devices 101 to 105 (i.e., data producers and data consumers), so that end devices 101 to 105 may exchange data between each other via the data transmission infrastructure of the data network 10.

In order to implement the distributed name resolution approach as described herein, as illustrated in FIG. 1, the data network 10 includes two types of devices: routers and name resolvers. The ICN-layer 20 includes multiple routers 121, 123, 125, 127 that provide connectivity to end devices 101 to 105. Each router is assigned to an aircraft and is carried aboard an aircraft. However, in certain embodiments, multiple routers may be located aboard the same aircraft. The routers provide services to the end devices located aboard the same aircraft. The end devices 101 to 105 may be connected to the router(s) by wired connections or in a wireless manner. Any connection technology may be used at this point. The name resolvers 131, 133 of the name resolution layer 30 are typically ground devices and are configured to convert names into locators, such as geographic coordinates in any format (for example and without limitation: latitude and longitude values, grid coordinates in a grid reference system, in a stereographic coordinate system, in the Universal Transverse Mercator system, or in the Universal Polar Stereographic system).

In one example, the routers are mobile devices with air-to-air communication interfaces 124 (first interface, configured to establish a connection to another mobile router aboard another aircraft), air-to-ground communication interfaces 128 (third interface, configured to establish a connection to a name resolver 131, 133), and second communication interfaces 126 that are configured to establish a data connection to an end device 101 to 105.

The routers may comprise a local cache 122 where data generated by data producers (connected to the respective router either local, i.e., directly, or remote, i.e., not directly connected) can be stored. The routers know the geographic location of their neighbor routers (e.g., by broadcasting information via an ADS-B system and they know the geographic location of all name resolvers 131, 133. The position of the name resolvers may be pre-configured in a memory of the routers.

In one example, the name resolvers are static devices connected to an IP network of the data transmission layer 40 (e.g., Internet or any other data transmission infrastructure). The name resolvers may be collocated with a gateway, handling the exchange of data between the flying ad-hoc network of the ICN layer 20 and the IP network 40. Particularly, the name resolvers have a local cache 132 where data generated by data producers can be stored. The name resolvers know the geographic location of all routers 121, 123, 125, 127 (in particular even if the routers are not located in line of sight with regard to a name resolver) via a system accessible via the data transmission layer 40. The geographic location of the routers may be retrieved from a flight control system or mission control in the case of military and space systems. The name resolvers can communicate between each other via IP multicast (resolvers are configured with the needed IP multicast addresses and may implement a dataset synchronization protocol (e.g., ChronoSync or PSync).

In the data network 10, a data object is identified by an information object described as follows:

Information Object {source; name; topic; QoS; geo-location; lifespan} wherein:

source identifies the origin of the data object, for example by identifying a flight number, an aircraft identifier, or a router identifier;

name indicates the name of the data object;

topic indicates the topic of the data such as VoIP, SIP, HTTP, and the like;

QoS indicates the quality requirements such as differentiated service code point;

geo-location indicates the geographic location of the data object; and lifespan indicates the validity date of the data object.

The fields are created by a router based on information provided via an interface to data producers. The fields source and name can be flat (e.g., identifier of a flight or an IP-address and port number) or hierarchical (e.g., /manufacturer/aircraft-id or/datatype/folder/subfolder/object). The field geo-location has the geographic location of all devices that holds a copy of the information object.

The data network 10 is configured to implement three states when applying the name resolution scheme described herein:

a) the Name_Publication_State is triggered by a data producer;

b) the Name_Resolution_State is triggered by a data consumer; and c) the Information_Object_Update state that is triggered by a name resolver.

Messages are exchanged between routers and name resolvers based on two messages described in the ICN paradigm: an interest message and a data message. The proposed name resolution scheme defines two types of interest messages and data messages for the Name Publication State (Pub_Interest; Data_Interest) and for the Name Resolution State (Res_Interest; Res_Data).

The defined messages are exchanged between routers and name resolvers based on a locally implemented geographic routing protocol, such as GPSR (greedy perimeter stateless routing).

Figure 2:
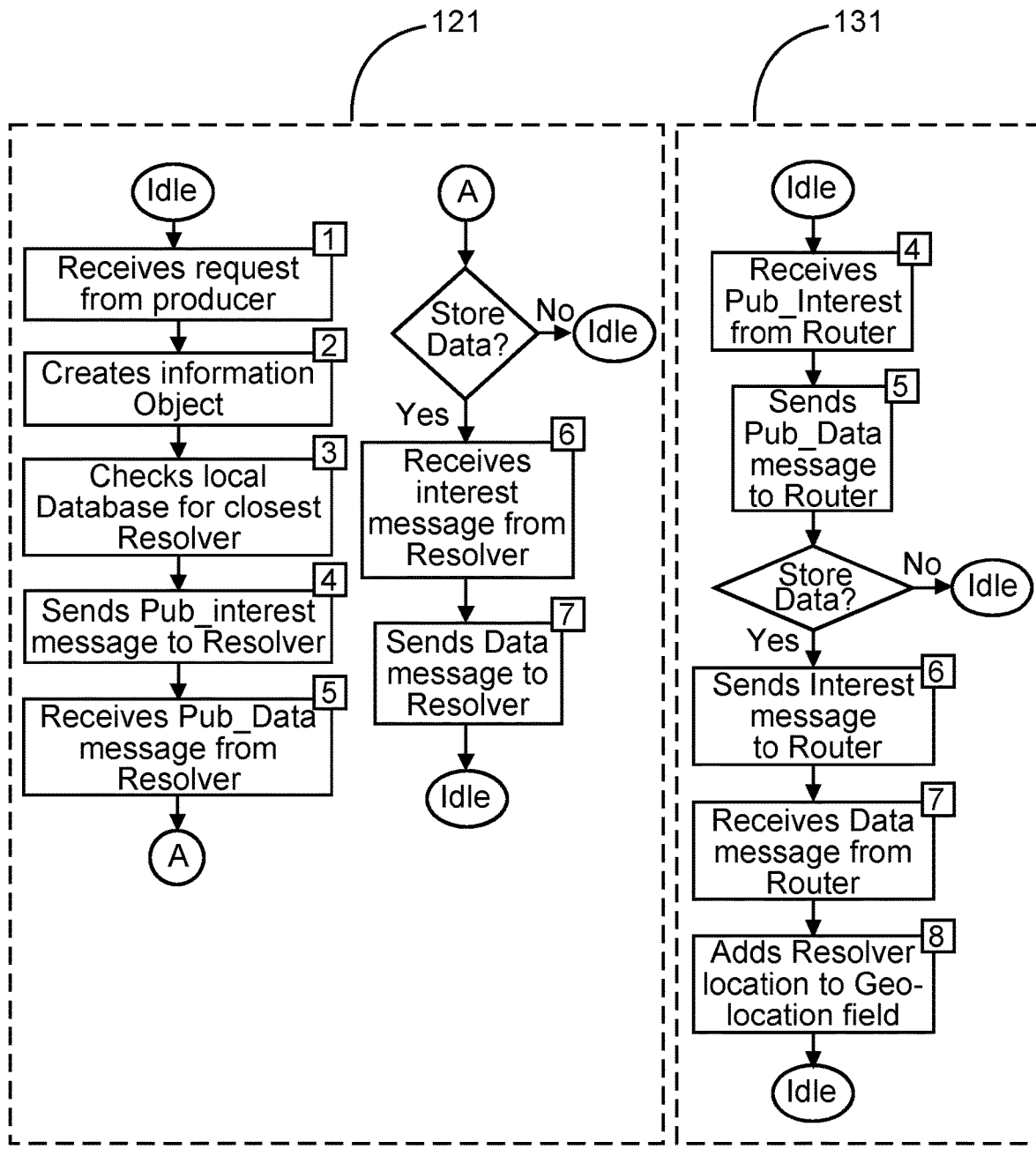
FIG. 2 is a schematic representation of router and resolver actions during a name publication stage.

FIG. 2 schematically shows an example of the steps executed in the name publication state. FIG. 2 assigns the steps to a router 121 and to a name resolver 131, respectively.

In step 1, a producer triggers the local router to make some data available. Then, in step 2, the router creates an information object to describe that data. In step 3, the router checks the local database of name resolvers to identify the geographically closest name resolver based on the router's current geographic location. In step 4, the router sends a Pub_Interest message (based on an ICN interest message) towards the closest name resolver 131 with the information object of the data produced locally. The Pub_Interest message includes a field (Store_Data) informing the name resolver if the router wants to store the data in the name resolver cache. It is noted that step 4 contains an action executed by the router 121 and the name resolver 131. In step 5, the name resolver 131 sends a Pub_Data message and the router receives that Pub_Data message (based on ICN data messages) from the name resolver acknowledging the publication of the information object. If the Store_Data mentioned before in step 4 is active in the Pub_Interest message, the method proceeds to step 6 and the name resolver 131 sends an interest message towards the router (using the geo-location field in the information object) to request the data to be stored. In step 7, the router 121 sends a set of data messages with the data to be stored in the name resolver cache. Then, in step 8, the name resolver 131 adds its own geographic location to the geo-location field of the information object.

When name resolvers 131, 133 are collocated with gateways towards an IP network of the data transmission layer 40, the Name_Publication_State can also be triggered by the collocated gateway in order to publish information objects describing a service level specification established with the local Internet Service Provider (ISP). In this case the field "geo-location"

has the geographic location of the name resolver itself, and the field "source" has the name of the ISP.

Figure 3:
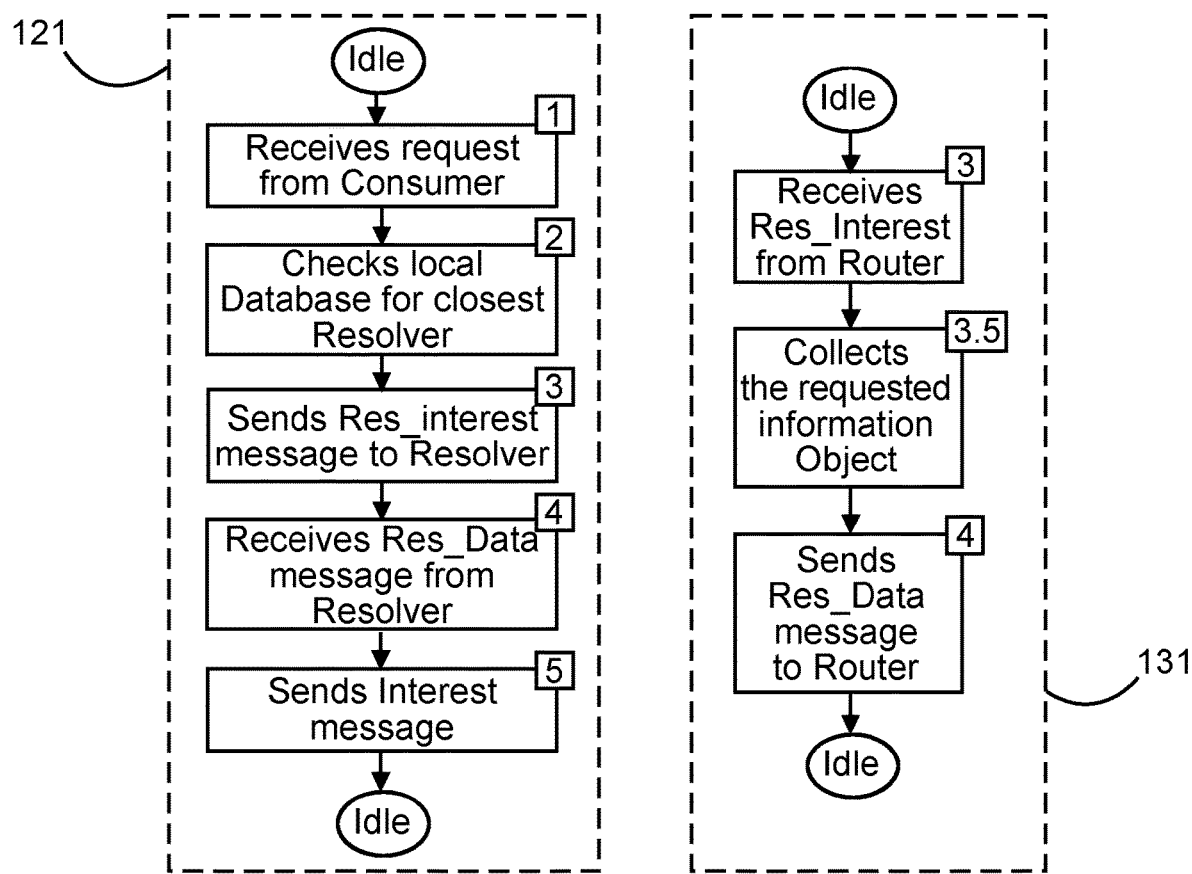
FIG. 3 is a schematic representation of router and resolver actions during a name resolution stage.

FIG. 3 schematically shows an example of the steps executed in the name resolution state. FIG. 3 assigns the steps to a router 121 and to a name resolver 131, respectively.

In step 1, a data consumer triggers the local router to access a data set described by the tuple (source, name), i.e., the data consumer requests a data object. In one example, either of the two fields of the tuple can be empty. For instance, the tuple (source: *) means that the data consumer requests any data set from that source (step 1 in FIG. 3). In step 2, the router checks the local database of name resolvers to identify the closest name resolver based on the router's current geographic location. In step 3, the router sends a Res_Interest message (based on ICN interest message) with the of tuple (source; name) towards the closest name resolver and the name resolver 131 receives the Res_Interest message. Then, in step 3.5, the name resolver 131 gathers in the local database the information object(s) related to the tuple (source, name). In step 4, the name resolver sends a Res_Data message to the router and the router receives that Res_Data message (based on ICN data messages) from the name resolver with the respective information object or the data itself, in case it is stored in the name resolver cache. In step 5, the router sends a message towards any of the geo-location stored in the information object, depending on the locally configured forwarding strategy (e.g., send interest message towards the closest copy of data).

In the Information Object Update State, name resolvers regularly update the geo-location field of each information object after querying a system such as flight control or mission control via the IP network. This query requests for the current locations of the mobile entities with the data producers, data consumers, and routers. The name resolvers synchronize among themselves the state of the stored information objects via a dataset synchronization protocol.

Figure 4:
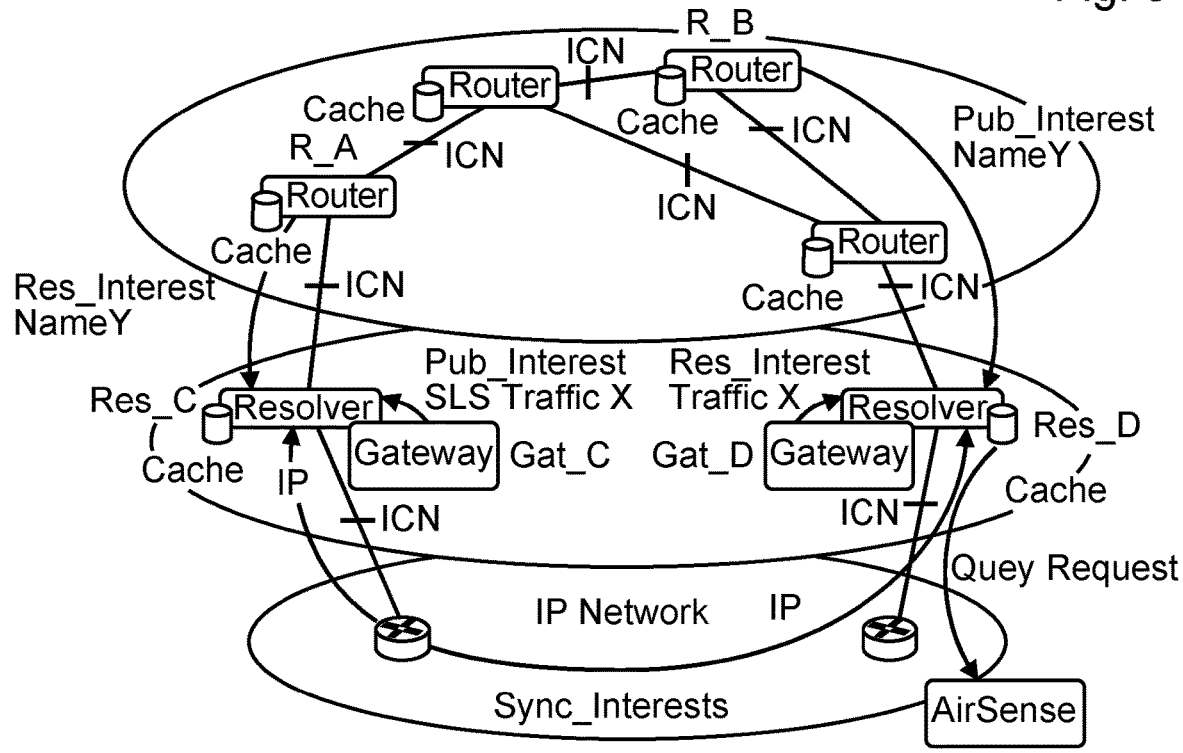
FIG. 4 and FIG. 5 schematically show the steps of a method for resolving names in a data network.
Figure 5:
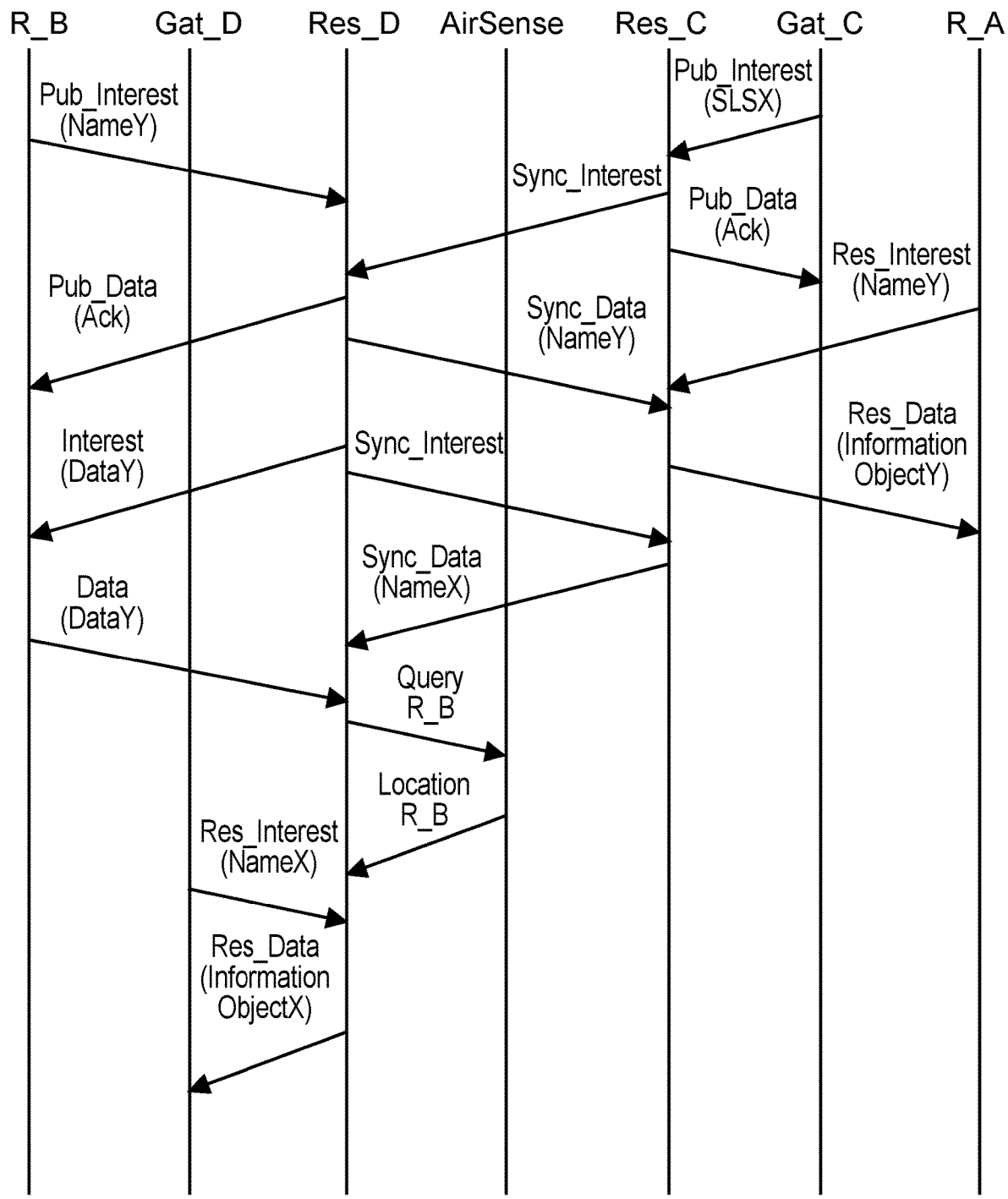

FIGS. 4 and 5 provide an example of the operation of the proposed distributed name resolution scheme. The message exchange is based on the messages already explained with reference to FIGS. 2 and 3.

The data network 10 shown in FIG. 4 corresponds to the data network 10 is shown in FIG. 1 and includes the ICN-layer, the name resolution layer, and the data transmission layer.

FIGS. 4 and 5 show examples in which router R_B publishes a data set with NameY (PubInterest NameY), requesting name resolver Res_D to locally store a copy of the DataY. This data set is requested by router R_A (Res_Interest NameY), being the respective information object provided to router R_A by name resolver Res_C, after a synchronization process between the name resolvers Res_C and Res_D.

In FIG. 4, the data connections between the routers in the ICN-layer are ICN-links. Also, the data connections between the routers and the name resolvers of the name resolution layer are ICN-links. The connections between the name resolvers and the network nodes of the data transmission layer are !P-links.

FIGS. 4 and 5 also show an example of a name resolution related to a data set that is generated in the data transmission layer (e.g., in the Internet). In this case, gateway Gat_C publishes near the collocated Res_C an information object related to an SLS X negotiated with a local ISP (Pub_Interest SLS Traffic X). Based on the synchronization process between name resolvers Res_C and Res_D, the latter can respond to the local request of gateway Gat_D to access data related to SLS X.

The example of FIGS. 4 and 5 also shows that periodically name resolvers are able of updating the geo-location field of stored information objects by querying a flight control system (like the Airbus AirSense system) via an IP connection.

FIG. 5 shows the message exchange between the components referred to in FIG. 4 and additionally shows the synchronization messages.

While at least one example embodiment has been presented in the foregoing detailed description, it should be appreciated that a vast number of variations exist. It should also be appreciated that the example embodiment or example embodiments are only examples, and are not intended to limit the scope, applicability, or configuration of the disclosure herein in any way. Rather, the foregoing detailed description will provide those skilled in the art with a convenient road map for implementing an example embodiment of the disclosure herein. It will be understood that various changes may be made in the function and arrangement of elements described in an example embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above example embodiments may also be used in combination with other features or steps of other example embodiments described above. Reference signs in the claims are not to be construed as a limitation.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 data network
20 information-centric network layer, ICN-layer
30 name resolution layer
40 data transmission layer
101-105 end device (producer, consumer)
121, 123, 125, 127 router
122 cache
124 first interface
126 second interface
128 third interface
131, 133 name resolver
132 cache

The invention claimed is:

1. A data network, comprising:
an information-centric network layer (ICN-layer) with multiple routers;
a name resolution layer with multiple name resolvers;
wherein at least one router of the ICN-layer is a mobile device and includes a first interface configured to establish a connection to another router of the ICN-layer, a second interface configured to establish a connection to an end device, and a third interface configured to establish a connection to a name resolver of the name resolution layer;
wherein each router of the multiple routers of the ICN-layer is configured to receive an interest packet announcement describing data objects provided by a data producer;
wherein each router of the multiple routers of the ICN-layer is configured to determine a first name resolver of the name resolution layer that is spatially closest to the data producer and send a name of the provided data object and a geo-location of the data producer to the first name resolver;
wherein the first name resolver is configured to transmit a name of the provided data object and the geo-location of the data producer to other name resolvers of the name resolution layer;
wherein each router of the multiple routers of the ICN-layer is configured to receive an interest packet request describing a data object requested by a data consumer;
wherein each router of the multiple routers of the ICN-layer is configured to transmit the interest packet request to a second name resolver that is spatially closest to the data consumer;
wherein each name resolver is configured to provide geo-location of the requested data object to the data consumer.

2. The data network of claim 1, wherein at least some of the multiple routers of the ICN-layer are located aboard mobile units.

3. The data network of claim 1,
wherein at least one router of the ICN-layer includes a cache memory;
wherein the cache memory of the at least one router is configured to store the data objects provided by a data producer.

4. The data network of claim 1, wherein the multiple name resolvers are static components.

5. The data network of claim 1,
wherein at least one name resolver of the multiple name resolvers incudes a cache memory;
wherein the cache memory of each name resolver is configured to store data objects provided by a data producer.

6. The data network of claim 1, wherein the connection between routers of the ICN-layer is an information-centric network data link.

7. The data network of claim 1, wherein the announcement received by the routers of the ICN-layer includes:
a data object source indicating an origin of a data object;
a data object name indicating a name of the data object;
a data object type indicating a topic of the data object;
quality of service requirements of the data object;
a geo-location of the data producer of the data object indicating a geographic location of the data and/or of the data producer;
a lifespan of the data object indicating a validity date of the data.

8. The data network of claim 1, wherein each router of the multiple routers of the ICN-layer is configured to determine a name resolver closest to the data producer and/or the data consumer based on known geographic locations of the name resolvers and a current position of the data producer and/or data consumer.

9. The data network of claim 8, wherein each router of the multiple routers of the ICN-layer includes a look-up table with geographic locations of the name resolvers.

10. The data network of claim 1, wherein the data network implements a data synchronization mechanism between the name resolvers of the name resolution layer to synchronize information about the name of a data object and the geo-location of the respective data producer.

11. The data network of claim 1, wherein the name resolvers are configured to communicate with each other via multicast addresses.

12. A method for resolving names in a data network, the method comprising:
receiving, by a router of multiple routers of an information-centric network layer, ICN-layer, an interest packet announcement describing data objects provided by a data producer;
determining, by the router, a first name resolver of a name resolution layer, that is spatially closest to the data producer;
sending, by the router, a name of the provided data object and a geo-location of the data producer to the first name resolver;
transmitting, by the first name resolver, the name of the provided data object and the geo-location of the data producer to other name resolvers of the name resolution layer;

receiving, by the router, an interest packet request describing a data object requested by a data consumer;

transmitting, by the router, the interest packet request to a second name resolver that is spatially closest to the data consumer; and providing, by each name resolver of the name resolution layer, the geo-location of the requested data object to the data consumer.

* * * * *